(12) United States Patent
Rangarajan et al.

(10) Patent No.: US 11,475,321 B2
(45) Date of Patent: Oct. 18, 2022

(54) AUTOMATED EXTRACTION OF RULES EMBEDDED IN SOFTWARE APPLICATION CODE USING MACHINE LEARNING

(71) Applicant: Tata Consultancy Services Limited, Mumbai (IN)

(72) Inventors: Rama Rangarajan, Chennai (IN); Tamildurai Mehalingam, Chennai (IN); Yogananda Ravindranath, Chennai (IN); Sairoopa Santhanaraman, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 755 days.

(21) Appl. No.: 16/450,407

(22) Filed: Jun. 24, 2019

(65) Prior Publication Data

US 2019/0392329 A1    Dec. 26, 2019

(30) Foreign Application Priority Data

Jun. 25, 2018  (IN) .............................. 201821023591

(51) Int. Cl.
*G06F 9/44* (2018.01)
*G06F 9/445* (2018.01)
*G06F 9/455* (2018.01)
*G06N 5/02* (2006.01)
*G06N 20/00* (2019.01)
*G06F 8/41* (2018.01)
(Continued)

(52) U.S. Cl.
CPC .............. *G06N 5/025* (2013.01); *G06F 8/433* (2013.01); *G06F 8/76* (2013.01); *G06F 11/3604* (2013.01); *G06N 20/00* (2019.01)

(58) Field of Classification Search
CPC ........ G06N 5/025; G06N 20/00; G06F 8/433; G06F 8/76; G06F 11/3604
See application file for complete search history.

(56) References Cited

U.S. PATENT DOCUMENTS 9,342,784 B1 * 5/2016 Rajagopal ................. G06F 8/76
10,467,122 B1 * 11/2019 Doyle ................... G06Q 20/207
(Continued)

FOREIGN PATENT DOCUMENTS

CN          105308558 A  *  2/2016  ........ G06F 17/30011

OTHER PUBLICATIONS

Zhengong Cai, A Pattern-Based Code Transformation Approach for Cloud Application Migration, 2015, pp. 33-40. https://ieeexplore.ieee.org/stamp/stamp.jsp?tp=&arnumber=7214025 (Year: 2015).*
(Continued)

*Primary Examiner* — Mongbao Nguyen
(74) *Attorney, Agent, or Firm* — Finnegan, Henderson, Farabow, Garrett & Dunner, LLP (57) ABSTRACT

The present disclosure relates to a method for automated extraction of rules in a software application code. The method discloses extracting rules embedded in the software application source codes based on a control flow analysis and a data flow analysis. Further, the extracted rules are translated into a target defined format based on mapping of parameters associated with the extracted rules with a pre-stored meta data. The translated rules are analyzed to obtain a validated set of rules.

16 Claims, 4 Drawing Sheets

(51) Int. Cl.
    *G06F 8/76*           (2018.01)
    *G06F 11/36*         (2006.01)

(56) References Cited

U.S. PATENT DOCUMENTS

| | | | |
|---|---|---|---|
| 10,558,809 B1 * | 2/2020 | Joyce | G06N 20/10 |
| 2009/0319313 A1 | 12/2009 | Subash et al. | |
| 2014/0282396 A1 * | 9/2014 | Manjarekar | G06F 8/74 |
| | | | 717/120 |
| 2017/0192758 A1 * | 7/2017 | Apte | G06F 8/76 |
| 2018/0144250 A1 * | 5/2018 | Kwon | G06F 16/289 |
| 2018/0314984 A1 * | 11/2018 | Wiener | G09B 19/18 |
| 2019/0129732 A1 * | 5/2019 | Sivertson | G06N 7/005 |
| 2019/0171438 A1 * | 6/2019 | Franchitti | G06N 20/00 |
| 2019/0236485 A1 * | 8/2019 | Stanley, III | H04L 67/303 |
| 2021/0081566 A1 * | 3/2021 | Broudou | G06N 20/00 |

OTHER PUBLICATIONS

Robert Feldt, Ways of Applying Artificial Intelligence in Software Engineering, 2018, pp. 35-40. https://ieeexplore.ieee.org/stamp/stamp.jsp?tp=&arnumber=8452880 (Year: 2018).*

Javier Escalada, An Efficient Platform for the Automatic Extraction of Patterns in Native Code, 2017, pp. 1-17. https://www.hindawi.com/journals/sp/2017/3273891/ (Year: 2017).*

Huang, H. et al. "Business Rule Extraction from Legacy Code," *Proceedings of 20th International Computer Software and Applications Conference: COMPSAC '96*, Seoul, South Korea, Aug. 21-23, 1996; pp. 162-167.

* cited by examiner

AUTOMATED EXTRACTION OF RULES EMBEDDED IN SOFTWARE APPLICATION CODE USING MACHINE LEARNING

PRIORITY CLAIM

This U.S. patent application claims priority under 35 U.S.C. § 119 to: India Application No. 201821023591, filed on Jun. 25 2018. The entire contents of the aforementioned application are incorporated herein by reference.

TECHNICAL FIELD

The disclosure herein generally relates to extraction of rules, more particularly, to automated extraction of rules embedded in a software application code using machine learning.

BACKGROUND

Transformation of many software applications, developed using legacy code, has become important to meet current generation business requirements and improving efficiency of many business applications. Many applications such as insurance applications dealing with products, rating, underwriting, policy services, bills, document management, regulatory reporting, claims, and actuary are a decade old and have rules embedded in the legacy code.

Traditionally, transformation of the software applications involved studying the software application code and extracting business knowledge or rules from the application source code. Rule extraction is the process of identifying implementation of independent (business) logic that comprises basic essence of applications. Such a logic is normally characterized by a combination of conditional and imperative source code commands that affect a change on a business data entity. Conventional methods require a lot of manual effort and time for transformation of the software applications. There exist solutions such as automating the transformation of the software applications to some extent. However, the process of extracting rules implemented by the existing solutions is a computationally tedious and time-consuming task.

Further, rules embedded in the application source code are often more complex than simple conditional statements. The application source code comprises tangled rule flows with a combination of rule constructs evolved over a period of time. Thus, the complexity involved in extracting and transforming the rules is very high resulting in missing of many important rules embedded over a period of years/decades.

SUMMARY

Embodiments of the present disclosure present technological improvements as solutions to one or more of the above-mentioned technical problems recognized by the inventors in conventional systems. For example, in one aspect, there is provided a processor implemented method, comprising: receiving, a plurality of inputs from one or more application source code components associated with one or more software applications, wherein the plurality of inputs includes one or more source codes pertaining to the one or more software applications; extracting, based on a control flow and data flow analysis, a set of rules embedded in the application source codes of the one or more software applications, wherein the control and data flow analysis generates a hierarchical call structure of one or more programs comprised in application source code of the one or more software applications; translating, one or more rules from the extracted set of rules into a target defined format, wherein the one or more rules are translated based on mapping one or more parameters associated with the one or more rules using one or more machine learning techniques with a pre-stored meta data and classifying the mapped one or more parameters into one or more categories; and analyzing, by one or more processors, the translated set of rules to obtain a validated set of rules.

In an embodiment, the step of classifying the mapped one or more parameters into the one or more categories is utilized to derive relevant information from the one or more parameters associated with extracted set of rules. In an embodiment, the relevant information for the one or more parameters is derived using data acquired by performing a static code analysis on the received plurality of inputs. Further, the data acquired by performing a static code analysis includes data type and usage of the one or more parameters associated with the one or more rules, type of impact of a rule in which the one or more parameters are used, and scope of the impact. In an embodiment, the step of translating is preceded by performing at least one of (i) a merging mechanism or (ii) a splitting mechanism on the extracted set of rules.

In another aspect, there is provided a system comprising: a memory storing instructions; one or more communication interfaces; and one or more hardware processors coupled to the memory through the one or more communication interfaces, wherein the one or more hardware processors are configured by the instructions to receive, a plurality of inputs from one or more application source code components associated with one or more software applications, wherein the plurality of inputs includes one or more source codes pertaining to the one or more software applications; extract, based on a control flow and data flow analysis, a set of rules embedded in the application source codes of the one or more software applications, wherein the control and data flow analysis generates a hierarchical call structure of one or more programs comprised in rules from the extracted set of rules into a target defined format, wherein the one or more rules are translated based on mapping one or more parameters associated with the one or more rules using one or more machine learning techniques with a pre-stored meta data and classifying the mapped one or more parameters into one or more categories; and analyze, by one or more processors, the translated set of rules to obtain a validated set of rules.

In an embodiment, the step of classifying the mapped one or more parameters into the one or more categories is utilized to derive relevant information from the one or more parameters associated with extracted set of rules. In an embodiment, the relevant information for the one or more parameters is derived using data acquired by performing a static code analysis on the received plurality of inputs. Further, the data acquired by performing a static code analysis includes data type and usage of the one or more parameters associated with the one or more rules, type of impact of a rule in which the one or more parameters are used, and scope of the impact. In an embodiment, prior to obtaining the translated set of rules, the one or more hardware processors are configured to perform at least one of (i) a merging mechanism or (ii) a splitting mechanism on the extracted set of rules.

In yet another aspect, there are provided one or more non-transitory machine readable information storage mediums comprising one or more instructions which when executed by one or more hardware processors cause receiving, a plurality of inputs from one or more application source code components associated with one or more software applications, wherein the plurality of inputs includes one or more source codes pertaining to the one or more software applications; extracting, based on a control flow and data flow analysis, a set of rules embedded in the application source codes of the one or more software applications, wherein the control and data flow analysis generates a hierarchical call structure of one or more programs comprised in application source code of the one or more software applications; translating, one or more rules from the extracted set of rules into a target defined format, wherein the one or more rules are translated based on mapping one or more parameters associated with the one or more rules using one or more machine learning techniques with a pre-stored meta data and classifying the mapped one or more parameters into one or more categories; and analyzing, by one or more processors, the translated set of rules to obtain a validated set of rules.

In an embodiment, the step of classifying the mapped one or more parameters into the one or more categories is utilized to derive relevant information from the one or more parameters associated with extracted set of rules. In an embodiment, the relevant information for the one or more parameters is derived using data acquired by performing a static code analysis on the received plurality of inputs. Further, the data acquired by performing a static code analysis includes data type and usage of the one or more parameters associated with the one or more rules, type of impact of a rule in which the one or more parameters are used, and scope of the impact. In an embodiment, prior to obtaining the translated set of rules, the instructions may further cause performing at least one of (i) a merging mechanism or (ii) a splitting mechanism on the extracted set of rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a system and method for automated extraction of one or more rules embedded in a software application code using machine learning technique(s). The system receives a plurality of inputs from the application code components, wherein the plurality of inputs may include source codes pertaining to software applications. Further, the plurality of inputs from application code components are parsed and analyzed to extract a plurality of possible rules present in the system based on its control flow and data flow. Upon extraction of the plurality of possible rules present in the system, technical rule(s) among the plurality of possible rules is/are identified and eliminated. Based on the requirements, a simultaneous mechanism for splitting and merging of the plurality of extracted possible rules can be executed. Further, the plurality of extracted possible rules are translated with appropriate description into a target defined format. The plurality of translated rules are further analyzed to obtain a validated set of rules (or set of validated rules) which are used for delivery.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
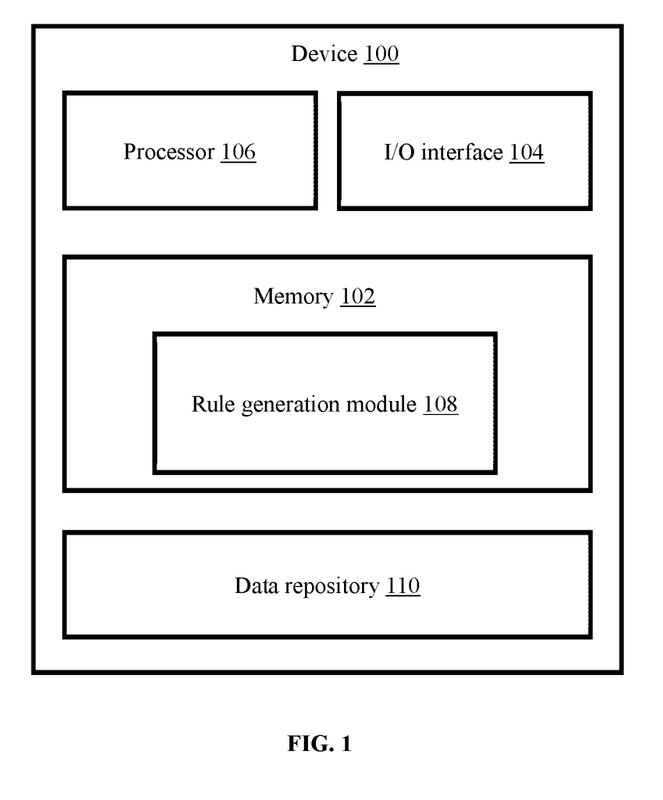
FIG. 1 illustrates a system diagram for automated extraction of rules embedded in a software application code using machine learning, in accordance with an example embodiment of the present disclosure.

FIG. 1 illustrates a system diagram for automated extraction of one or more rules embedded in a software application code using machine learning technique(s), in accordance with an example embodiment of the present subject. The system or device 100 includes or is otherwise in communication with one or more hardware processors such as a processor 106, an I/O interface 104, at least one memory such as a memory 102, and a rule generation module 108. In an embodiment, the rule generation module 108 can be implemented as a standalone unit in the system 100. In another embodiment, the rule generation module 108 can be implemented as a module in the memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes the plurality of modules 108 and a repository 110 for storing data processed, received, and generated by one or more of the modules 108. The modules 108 may include routines, programs, objects, components, data structures, and so on, which perform particular tasks or implement particular abstract data types.

The repository 110, amongst other things, includes a system database and other data. The other data may include data generated as a result of the execution of one or more modules in the modules 108.

In an embodiment, the rule generation module 108 can be configured to reduce the manual intervention. A detailed description of the above-described system for automated extraction of rules embedded in the software application code using machine learning is shown with respect to illustrations represented with reference to FIGS. 1 through 4.

Figure 2:
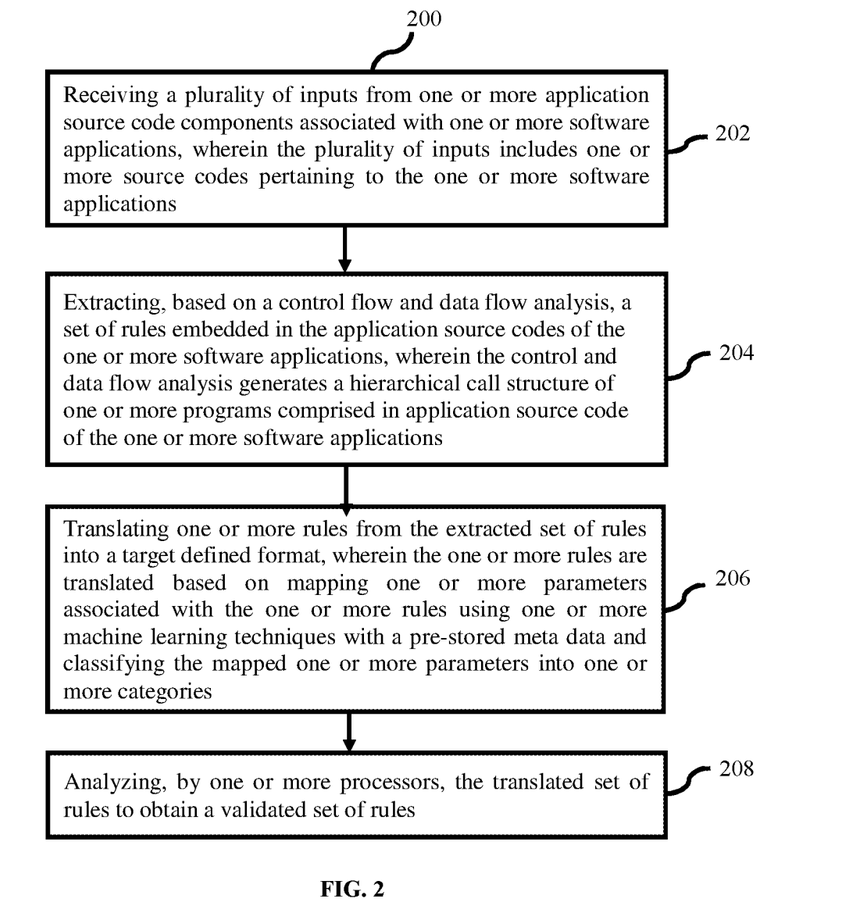
FIG. 2 is an exemplary flow diagram of a processor implemented method for automated extraction of rules embedded in a software application code using machine learning, in accordance with an example embodiment of the present disclosure.

FIG. 2, with reference to FIG. 1, is an exemplary flow diagram of a processor implemented method for automated extraction of one or more rule embedded in a software application code using machine learning, using the rule generation module 108 of FIG. 1, in accordance with some embodiments of the present disclosure. Referring to FIG. 2, at step 202, the one or more hardware processors are configured to receive a plurality of inputs from one or more application source code components associated with one or more software applications. In an embodiment, the plurality of inputs include one or more source codes pertaining to the one or more software applications. The plurality of inputs are received, using a parser module (not shown in FIGS. 1-2), from a plurality of data sources also referred as source inventory. The parser module is used as a user interface between the one or more software applications and external world and provides an understandable structure format of the received plurality of inputs. The source inventory stores data related to one or more software applications, wherein the one or more software applications may include batch jobs, programs, online transactions and the like.

Referring back to FIG. 2, at step 204, the one or more hardware processors (106) are configured to extract, based on a control flow and data flow analysis, a set of rules embedded in the application source codes of one or more software applications. In an embodiment, the control and data flow analysis generates a hierarchical call structure of one or more programs present in application source code of the one or more software applications. In another embodiment, the control flow and data flow analysis determine a control flow and data flow between the one or more programs and are expressed as a control flow and data flow graph. The control flow and data flow analysis could be performed using techniques comprising abstract representation, resolving dynamic calls, object resolutions, and control transfers. The detailed description of extraction process of the set of rules embedded in the application source codes of one or more software applications is further provided in FIG. 3.

Figure 3:
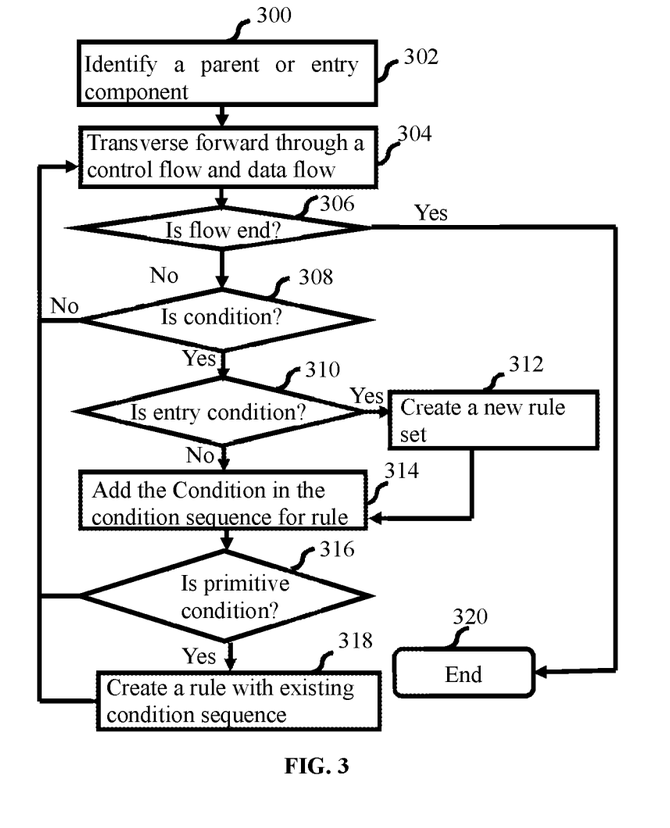
FIG. 3 illustrates a flow diagram for performing extraction of one or more rules, in accordance with an example embodiment of the present disclosure.

FIG. 3 illustrates a flow diagram for performing the extraction process of the set of rules embedded in the application source codes of one or more software applications, in accordance with an example embodiment of the present subject. At step 302 of the FIG. 3, a set of parent component(s) or the entry point component(s) for the software application are identified and grouped with corresponding one or more child programs components providing a plurality of grouped components. Here, each program in group may include a plurality of conditional statements. In an embodiment, the parent component and the one or more child components are identified based on the hierarchical call structure generated by an analysis based on the control flow and data flow, wherein the parent program is capable of calling the one or more child programs. As inherent in the field of software applications, all software applications comprise program components. In software platforms, every online transactions and batch jobs invokes a parent or an entry point program component and the system first captures this information from the available application source inventory. In an embodiment, the hierarchical call structure is generated from the parent component or entry point component, by including each of the one or more child programs also known as programs in the control flow and data flow. For example, if a Program A calls Program B and Program C then Programs A, B and C generate a hierarchical call structure based on a control flow and data flow, then Program A is identified as the parent or an entry point program which is capable of controlling one or more child programs (in this case Program B and Program C). The components in the hierarchical call structure are grouped and associated with the parent or entry point component. The number of parent components or entry point components determine the number of groups that gets formed for a given application. All the further process steps are performed independently in each such logical groups.

Further, as depicted in step 304 of FIG. 3, the extraction process includes traversing forward through the control and data flow till the end of either the control flow or the data flow. While traversing forward through the control flow and the data flow, as depicted in step 306 of FIG. 3, a status of the control or data flow is determined in the hierarchical call structure(s) of one or more programs associated with identified parent program component(s) or entry point component. Here, the status corresponds to end or no end of control or data flow. Further, as depicted in step 308 of FIG. 3, the one or more hardware processors (106) are configured to identify one or more conditional statements among the plurality of group components. In an embodiment, the one or more conditional statements generate rules, wherein the generated rules are identified by (i) generating one or more hierarchical structure of conditional statements based on a control flow analysis and (ii) performing a data flow based analysis in the hierarchical structure of conditional statements. The hierarchical structure defines parent or entry conditional statements and child conditional statements dependent on the parent or entry conditional statements. In traditional systems and method, the conditional statements and rules are identified based on a pattern based grouping and elimination process. The pattern based grouping and elimination process requires manual intervention, thereby poses challenges in automating the process (e.g., refer US patent application 20150268955 claiming priority from Indian patent application 966/MUM/2014 titled 'System and method for extracting a business rule embedded in an application source code'). The challenge is overcome by the present disclosure by identifying and grouping conditional statements as rules based on the control flow and data flow based analysis.

For example, as provided in the below mentioned scenario:
IF ACCOUNT-DURATION>="365"
MOVE 0.01 TO INTEREST-RATE.
PERFORM UPDATE-INTEREST.
UPDATE-INTEREST.
IF INTEREST-RATE=1.0
PERFORM UPDATE-ACCOUNT-DETAILS
IF INTEREST-RATE=0.01
PERFORM UPDATE-ACCOUNT-DETAILS . . . .

The US patent application 20150268955 creates at least two rules for the above mentioned scenario
Rule 1: IF ACCOUNT-DURATION>=365
IF INTEREST-RATE=1.0
IF ACCOUNT-DURATION>=365
IF INTEREST-RATE=0.01

But, analysis of action block in Condition 1 reveals that Rule 1 will never execute. The present disclosure analyses the data in the action block of the conditional statements and populates only Rule 2 ignoring Rule 1. Thus the present disclosure eliminates false positives, wherein Rule 1 depicted in the above example represents false positive.

In an embodiment, steps 304 through 308 of FIG. 3 are iteratively performed until all the conditional statements among the plurality of group components are identified or till the control/data flow ends. The control flow and data flow based analysis for identifying rules is further explained with reference to steps 310 through 320 of the FIG. 3. Upon identifying one or more conditional statements, as depicted in the step 310 of the FIG. 3, it is determined if the one or more identified conditional statements are parent or entry conditional statement. For example, as provided in the Table 1, the parent or entry conditional statement, for both WITHDRAW AND VIEW STATUS process, are checking the CUST-RETURN-CODE and based on the request type further processing happens.

TABLE 1

| | | | | |
|---|---|---|---|---|
| IF CUST-RETURN-CODE = EXISTING-CUSTOMER | | | | |
| | IF L-CUSTOMER-REQUSET OF CUSTOMER = 'W' | | | |
| | | IF ACCT-RETURN-CODE = EXISTING-ACCOUNT | | |
| | | | | WITHDRAW |
| | IF L-CUSTOMER-REQUEST OF CUSTOMER = 'S' | | | |
| | | IF ACCT-RETURN- | | |

TABLE 1-continued

| | | | | |
|---|---|---|---|---|
| | | CODE = EXISTING-ACCOUNT | | |
| | | | | VIEW STATUS |

The entire hierarchical structure of the conditional statements, as depicted in Table 1, form a rule set with CUST-RETURN-CODE check as parent or entry conditional statement. If the one or more identified conditional statements are identified as the parent or entry conditional statement, a new rule set is created as depicted in step 312, wherein a rule set comprises a group of one or more rules extracted from same parent or entry conditional statement. If the one or more identified conditional statements are not identified as the parent or entry conditional statement, then the one or more identified conditional statements are added in the sequence of hierarchical structure of conditional statements for the rule as depicted in step 314 of FIG. 3. Further, as depicted at step 316 of FIG. 3, it is determined if the one or more conditional statements added in the sequence of hierarchical structure of conditional statements are primitive conditional statements. In an embodiment, a primitive conditional statement is a conditional statement which does not have any child conditional statements under it and where final action happens. For example in the set of conditional statements provided below:
IF CUST-RETURN-CODE=EXISTING-CUSTOMER
IF L-CUSTOMER-STATUS OF CUSTOMER='A'
IF ACCT-RETURN-CODE=EXISTING-ACCOUNT
! (IF AMOUNT>SRC-BALANCE)
Conditional statement! (IF AMOUNT>SRC-BALANCE) is the primitive condition where final action happens. If the one or more conditional statements are added in the sequence of hierarchical structure of conditional statements are to arrive at the primitive conditional statements, then a rule with existing sequence of conditional statements is created in the hierarchical structure as depicted in step 318. Otherwise, the steps 304 through 316 are repeated until the primitive conditions in hierarchical structure of conditional statements are identified.

In an embodiment, each rule of the one or more rules generated is (a) identified with a unique naming convention for further processing and reference, (b) classified as simple, medium or complex based on the number of conditions that exists within the rule, (c) eliminated if generated as duplicate rule while generating the rules from logical group of components. In addition, all the rules extracted from a same start condition are grouped under the rule set.

In an embodiment, all rules when generated are marked as (business) or logic rules. The rules extracted from the legacy applications are huge in number and typically all of them need not be considered as rule for processing. Further, many of the rules could be a simple technical rule. For instance there could be rule(s) which is/are created for file operation, Database (DB) operation and the like. The present software applications require eliminating technical rules for reducing the number of rules to be processed. Such rule(s) is/are eliminated by filtering the rules based on pre-defined patterns. The pattern(s) or the filtering criteria comprise: (i) condition content at any level within the rule, (ii) program variable referred in condition, (iii) program variables used or modified as part of condition's action block. By way of a non-limiting example, eliminated technical rule may include SQLCODE and FILE-STATUS. All comparison with SQL- CODE can be ignored based on the pattern specified for elimination, in one example embodiment.

In one embodiment, the step of performing extraction of one or more rules for extracting the set of rules is preceded by satisfying one or more pre-requisites, wherein said one or more pre-requisites comprise (a) availability of business process and terms for the input applications (b) mapping of business process and terms with technical meta data of the applications, and (c) a pre-defined template to capture and deliver the extracted rules. Here, mapping of business process and terms with the technical components of the applications is performed using machine learning techniques. Mapped information is further utilized for providing auto populated details.

Referring back to FIG. 2, as depicted in step 206, the one or more hardware processors (106) are configured to translate one or more rules from the extracted set of rules into a target defined format. In an embodiment, the rules are translated based on mapping of the one or more parameters associated with the one or more rules using machine learning techniques with a pre-stored meta data and classifying the mapped parameters into one or more categories. In an embodiment, the target defined format is a rule template which is defined by users (or by system itself) on need basis. In an embodiment, the one or more parameters associated with the one or more rules may include but are not limited to (business/logic) terms, variables comprised in the application source code, business process, conditions and the like. Further, the machine learning techniques may include but not limited to a supervised machine learning techniques such as logistic regression. In an embodiment, learning starts with understanding of business meaning for each variable comprised in the application source code. In an embodiment, each variable comprised in the application code could be an input, a function of input, a function obtained based on a combination of multiple factors that are obtained from the static code analysis, an output, and the like. Further, the system is trained with each variable comprised in the application code along its corresponding business meaning which is learnt using the system. In an embodiment, prior to classification, it is assumed that initially all the variables comprised in the application source codes and their business terms are "UNKNOWN". Then each "UNKNOWN" variable is processed against available business metadata and data acquired from static code analysis in the form of technical knowledge and classified into one or more categories. This is not same as static code analysis data. The one or more categories may include but not limited to constants, system variables, flags, log variables, display variables, input variables, output variables and the like. For example, based on the classification and historical business metadata, the corresponding business term for each "UNKNOWN" variable is derived using the machine learning techniques. The machine learning techniques use all the available information that is generated above along with the historical training data to derive the possible business term for remaining "UNKNOWN" business terms where, "UNKNOWN" Business Terms=func (Known Business Terms) and "UNKNOWN" Business Terms=func (func (Known Business Terms)).

Here 'func' is a function relative to the application technical and business context and derived from the learning of the reference data. This learning and machine intelligence is also continuously updated with every input/every domain and thus continuously enhances the translation. In an embodiment, after completing the process of variable translation, same process is used to translate the conditions based on the usage and impact of the classified variable. According to the classification of the variable, the conditions involving them are also classified accordingly and termed as technical or business rules.

In an embodiment, the step of classifying the mapped parameters into the one or more categories is utilized to derive relevant information from the one or more parameters associated with extracted set of rules. Here, the relevant information refers to corresponding business meaning/term of the unknown variables which is used for further processing. In an embodiment, the relevant (or meaningful) information from the one or more parameters is derived using data acquired by performing a static code analysis on the received plurality of inputs. Here, the data acquired by performing a static code analysis includes data type and usage of the one or more parameters associated with the one or more rules, type of impact of rule in which the one or more parameters are used, scope of the impact and the like. Here, the data type refers to the type of variable through which mapping to business term can be done. In other words, a data type defines the type of data that a parameter can hold such as numeric, signed numeric, alphanumeric, date, timestamp etc. Data names and its type identified using static analysis is used for further analysis. Further, the type of impact is derived based on whether the parameter changes its value or a parameter which is only constantly used across as the same value. In addition to that it also has the type defined based on the statements in which it is used like simple assignment, arithmetic etc. Furthermore, scope of impact refers to the availability of parameter within the component, para or function, nested condition or simple condition. An example of relevant information derived using static code analysis is explained in insurance domain. For example, in insurance application, the data acquired from static code analysis includes a parameter which is (i) integer of size 3 (datatype), (ii) not much used in computations, has a comparatively larger usage in validations, all the validations are on numbers that are greater than 0 and less than 120 (usage), (iii) not modified much and mostly used as reference numbers (type of impact), and global scope (scope). The above mentioned data acquired from static code analysis in insurance domain further using machine learning techniques helps the system to determine a probable attribute which holds the age of the policy holder/claimant etc. Another example of relevant information derived using static code analysis is explained in retail domain. In retail domain, an example of the data acquired from static code analysis may include a parameter which is an (i) alphanumeric numeric variable of a defined size (data type), (ii) never changes its value throughout the application (type of impact), (iii) not involved in any computational statement (usage), and (iv) part of all the reports generated from the application and has a very wide use across the components in the application (scope). The above mentioned data acquired from static code analysis in retail domain further using machine learning techniques helps the system to determine a probable attribute which holds store ID or employee ID.

Further, the details of the one or more rules from the set of extracted rules which are translated based on mapping to the rule template pre-defined by the target, are auto populated to a (greater) extent. The auto populated details which enables better understanding of the rules comprise (a) unique rule identifier, (b) variables referred in the condition and the corresponding action blocks (c) variables modified in the condition and the corresponding action blocks, (d)

business terms referred/modified based on the mapping with pre-stored metadata, and (e) business parameters used like state code, country code and the like as per the requirement. The auto populated details mentioned above are further enhanced with machine learning techniques. The translation of rules in the required target defined format is supported by providing rule details such as identifying hierarchical structure of one or more conditional statements, flow chart of the paragraph/method based on technical and business metadata, variable based search both in condition and action block of the rule set, pattern based search within condition and action blocks, advanced search on rules focusing on condition level (leaf, top condition, etc.), and mapping of domain parameters to the existing hard coded values. For example, for mapping of domain parameters to the existing hard coded values if the template has domain parameters, for example, country code to be identified, values used with respect to country code are identified for the rule set and mapped automatically. Based on the above mentioned rule details, user can provide the description of the rules. This reduces the effort to be spent by the actual application developers to large extent. Furthermore, all the rules with its corresponding description are captured and stored internally as a JSON (JavaScript Object Notation). The structure of JSON is in alignment with the industry required standard which enables of porting of rules to the target platform/product with ease. The translation process completes once the description for all the rules identified are completed.

Referring back to FIG. 2, at step 208, after translation of the one or more rules with appropriate description into the target defined format, the one or more hardware processors (106) are configured to obtain a validated set of rules (or a set of validated rules) by analysing the translated set of rules. Analysis of the translated set of rules could be performed by machine or may require human intervention. For example, the translated set of rules could be reviewed and approved by subject matter experts and further delivered to end users. The validated set of rules are learnt by machine which could be used further for extraction process in an iterative manner. Thus, the present disclosure utilizes self-learning capability of the machine learning technique(s) which leads to optimized system performance. In an embodiment, the approved rules can be further downloaded in a format required by the target platform/product. The downloaded rules refer to the rules generated in the required format such as XML and JSON. Rule format required for further usage varies from user to user (e.g., from customer to customer) depending on the format required by target platform/product/applications. Due to the storage of the rules in industry standard format, rules generation in required format becomes easier with (quick) customization. In most of the scenarios, organization expects the rules to be downloaded in pre-defined XML format and the present disclosure ensures the same with minimal customization.

In an embodiment, the the step of performing translation is preceded by performing at least one of (i) a merging mechanism or (ii) a splitting mechanism on the extracted set of rules. In one embodiment, a mechanism for execution of rule splitting is provided. Rule split is an interactive process where in the users are allowed to split the rules based on the subject matter experts input and automated analysis done by the product. The mechanism for execution of rule splitting is further explained and depicted in FIG. 4.

Figure 4:
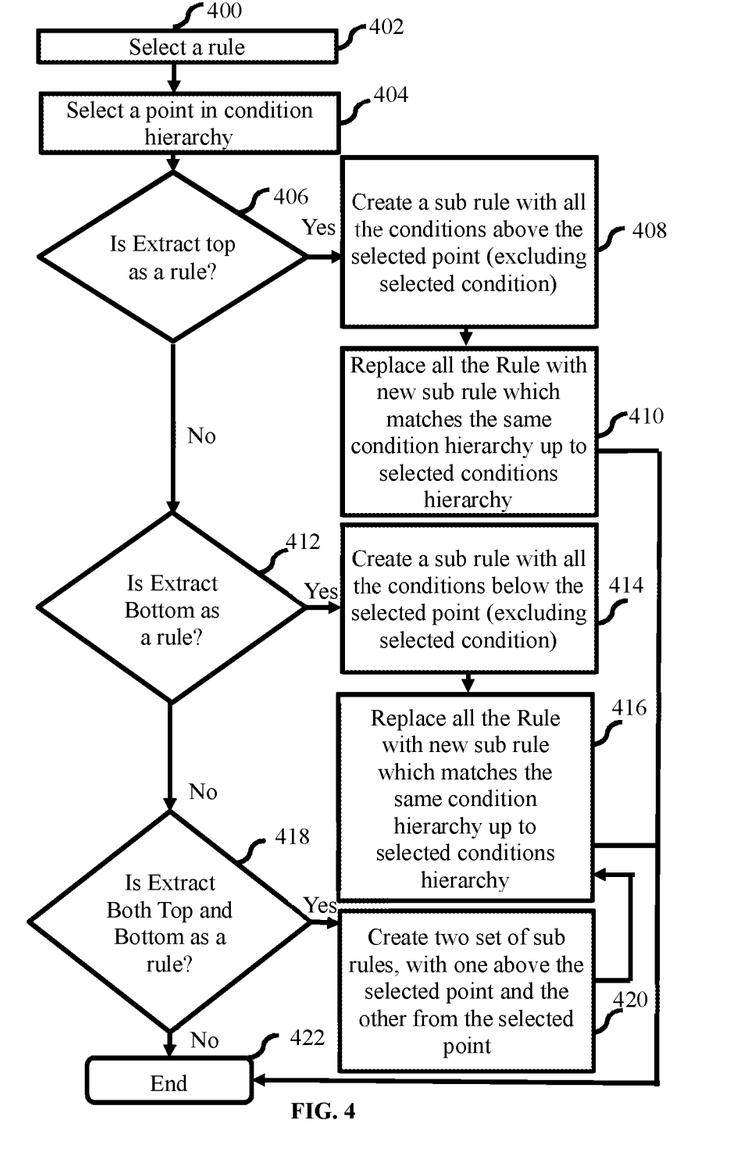
FIG. 4 illustrates a flow diagram for executing a rule splitting mechanism, in accordance with an example embodiment of the present disclosure.

FIG. 4 illustrates a flow diagram for executing rule splitting mechanism, in accordance with an example embodiment of the present disclosure. In the present disclosure, users are provided with an option to split each rules into sub rules. As depicted in the step 402 of FIG. 4, a rule is selected for performing a split operation. Further, in the selected rule, a hierarchical structure of conditional statements is identified and a point in the hierarchical structure of conditional statements is selected. The selected point can be any conditional statement present in a set of conditional statements selected by user. For example, in the below mentioned set of conditional statements
IF CUSTOMER-ID=10
IF CUSTOMER-ACCT-CATEGORY'J'
IF STATE-CODE='NY'
IF GENDER='M'
PERFORM CUSTOMER-PROCESSING
The point selected by user is IF STATE-CODE='NY'.
Further, as depicted in step 406 of FIG. 4, based on the user requirement and selected point in the hierarchical structure of conditional statements, it is determined if the conditional statements above the selected point in the hierarchical structure of conditional statements are extracted as rule. In case of affirmative response, as depicted in steps 408 and 410, a sub rule with all the conditional statements above the selected point in the hierarchical structure of conditional statements is created and all the rules are replaced with new sub rule which matches the same hierarchical structure of conditional statements up to selected hierarchical structure of the one or more conditional statements respectively. If the response of step 406 of FIG. 4 is negative, then, as depicted in step 412 of FIG. 4, it is determined whether the conditional statements below the selected point in the hierarchical structure of conditional statements are extracted as rule. Further, as depicted in steps 414 and 416 of FIG. 4, in case of affirmative response for the step 412 of the FIG. 4, a sub rule with all the conditional statements below the selected point in the hierarchical structure of conditional statements is created and all the rules with new sub rule are replaced, which matches the same hierarchical structure of conditional statements up to selected hierarchical structure of the one or more conditional statements respectively. Further, in case of negative response of step 412, as depicted in step 418 of FIG. 4, it is determined whether the conditional statements above and below the selected point in the hierarchical structure of conditional statements are extracted as rule. As depicted in step 420 of FIG. 4, in case of affirmative response for the step 418 of the FIG. 4, the hierarchical structure of conditional statements above and below from the selected point are identified as sub rule. A sub rule with all the conditional statements above the selected point in the hierarchical structure of conditional statements is created and all the sub rules with new sub rule are replaced which matches the same hierarchical structure of conditional statements up to selected hierarchical structure of the one or more conditional statements respectively. The steps 408, 410 414, and 416 of FIG. 4 are repeated until rule split process ends.

The mechanism of rule splitting is further explained by way of a non-limiting example. As provided in the below mentioned hierarchical structure of one or more conditional statements, the user can chose a conditional statement based on the business understanding
IF CUSTOMER-ID=10
IF CUSTOMER-ACCT-CATEGORY='J'
IF STATE-CODE='NY'
IF GENDER='M'
PERFORM CUSTOMER-PROCESSING
For example, if the user selects the conditional statement, IF STATE-CODE='NY', then, the user is allowed to split the rule as mentioned below:

(a) Above the selected conditional statement a sub rule;
(b) Below the selected conditional statement including the conditional statements selected as a sub rule;
(c) Or both as a sub rule.

The new sub rule identified is created as a new rule and this new rule becomes part of the original rule that exists. In case, if the identified sub rule already exists as a rule within the logical group of conditional statements and program components, then instead of creating new rule, the existing rule is referenced for further processing. For example, a (banking) transaction is assumed, where the interest rate is calculated based on the number of days in which the account is active. The "Interest Calculation" process starts from getting inputs on the customer details and the account details from a File/Database. The process flow would ideally include Rule 1: RECEIVE & PROCESS INPUT->CUSTOMER VALIDATION->ACCOUNT VALIDATION->UPDATE DEPOSIT INTEREST There are many similar processes where the flow would start from same entry points and branch into multiple sub processes.

For example:
Rule 2: RECEIVE & PROCESS INPUT->CUSTOMER VALIDATION->ACCOUNT VALIDATION->WITHDRAW MONEY
Rule 3: RECEIVE & PROCESS INPUT->CUSTOMER VALIDATION->ACCOUNT VALIDATION->DEPOSIT MONEY In all the above mentioned examples, it will be ideal to split the common part separately followed by the varying part.
Rule 1.1: RECEIVE & PROCESS INPUT->CUSTOMER VALIDATION->ACCOUNT VALIDATION
Rule 1.2: UPDATE DEPOSIT INTEREST
Rule 1.1: RECEIVE & PROCESS INPUT->CUSTOMER VALIDATION->ACCOUNT VALIDATION
Rule 2.1: WITHDRAW MONEY
Rule 1.1: RECEIVE & PROCESS INPUT->CUSTOMER VALIDATION->ACCOUNT VALIDATION
Rule 3.1: DEPOSIT MONEY Execution of rule splitting mechanism results in an increase in the number of rules, but the rules become much cleaner and aligned to their purpose of existence. SPLIT is the concept of splitting the rules based on their purpose/sub functionalities and for easier understanding/maintenance.

In one embodiment, a mechanism for execution of rule merging is provided. Merging is the process wherein the rules that have the same business meaning are merged together for better maintenance and migration of rules. Merging of rules enables the user to merge rules within the rule set. The rule merging mechanism includes selecting a rule that is required to be considered for merging. With the help of rich rule merging user interface, users are allowed to analyse and decide on selection of a set of rules that needs to be merged. Upon selecting a rule, a searching procedure is implemented, wherein the searching procedure involves searching for the rule based on the variables names used/modified by corresponding rule set and based on the pattern of the conditional statements. Further, based on the searching procedure, the selected rule is analysed to identify one or more similar rules within the corresponding rule set for merging, wherein identification of similarity between the selected rule and the one or more similar rules is achieved through analysis based on the selected rule and the one or more rules associated with the corresponding rule set. The analysis for identification of similarity between the selected rule and one or more similar rules involves comparison of the conditional statements from the parent condition in the hierarchical structure of one or more conditional statements to the point till a match is obtained and grouping them based on number of levels matched. Each matched rule is grouped based on the number of levels of exact match. Rule merging enables to identify relevant conditions in the rules and merge them to single rules and remove duplicates. Rules identified for merging are made inactive and a new rule gets created up to the level of match and the traceability with the other rules are maintained.

The rule merging mechanism is described by way of a non-limiting example, wherein the example assumes a banking transaction where the user access the banking portal through login for various transaction. The process flow for the assumed banking transaction would ideally be:
Rule 1: CUSTOMER VALIDATION->ACCOUNT VALIDATION->VALIDATE BALANCE->WITHDRAW MONEY
Rule 2: CUSTOMER VALIDATION->ACCOUNT VALIDATION->VALIDATE BALANCE->DEPOSIT MONEY In the example, the common rule involves validation of customer and account who has signed in. The customer and account validation is a unique rule that can be used for various business operations. The present disclosure enables the user to identify the above mentioned rules as a single group through the mapping process.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of extraction of rules from software application code which requires a lot of manual efforts and time. The embodiments, thus provide automated extraction of rules from software application code using machine learning. Moreover, the embodiments herein further provide identifying and grouping conditional statements as rules based on the control flow and data flow based analysis. The present disclosure provides more accurate identification of rules, intelligently eliminating duplicate rules, reduced efforts, reduction in the complexity of understanding and extracting valid rules, reduction in the risk in missing rules embedded over a period of time (e.g., years/decades), reduction in the time taken to complete entire process, reduction in the support required from the subject matter experts who developed the software, increase in the efficiency of extracting and migrating the rules to newer world, improvement in the productivity gain by 60-70% approximately. The present disclosure provides an automated mechanism by combining the control flow and data flow for removing possible false positives. Further, the present disclosure provides machine learning based formulations for rule mapping and translation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
receiving a plurality of inputs from one or more application source code components associated with one or more software applications, wherein the plurality of inputs includes one or more application source codes pertaining to the one or more software applications;
extracting, based on a control flow analysis and a data flow analysis, a set of rules embedded in the one or more application source codes of the one or more software applications, wherein
the extraction of the set of rules is preceded by satisfying one or more pre-requisites,
the one or more pre-requisites comprises (a) an availability of business process and terms for the input (b) mapping of the business process and terms with technical meta data of the one or more software applications, and (c) a pre-defined template to capture and deliver the extracted set of rules, and
the mapping of the business process and terms with the technical meta data is performed using machine learning techniques;
determining, using the control flow analysis and the data flow analysis, a control flow and a data flow between one or more programs of the one or more application source codes, wherein the control flow and the data flow are represented as a control flow graph and a data flow graph;
generating, using the control flow analysis and the data flow analysis, a hierarchical call structure of the one or more programs comprised in an application source code of the one or more application source codes, wherein
the hierarchical call structure is generated from parent components or entry point components by including each child program of one or more child programs in the control flow and data flow,
the parent components or the entry components and one or more child programs are associated with the one or more software applications,
components in the hierarchical call structure are grouped and associated with the parent components or the entry point components,
a status of the control flow and the data flow is determined from the generated hierarchical call structure, the status corresponds to:
end of the control flow and the data flow, and
no end of the control flow and the data flow;
identifying, based on the generated hierarchical call structure, a plurality of conditional statements of the one or more software applications;
traversing forward through the control flow and the data flow till end of either the control flow or the data flow;
identifying, among the group components, one or more conditional statements of the plurality of conditional statements that generate rules, wherein the generated rules are identified by:
generating one or more hierarchical structures of the one or more conditional statements based on the control flow analysis; and
performing a data flow based analysis in the one or more hierarchical structures of the one or more conditional statements;

eliminating technical rules of the extracted set of rules, by filtering the generated rules based on pre-defined patterns, wherein the pre-defined patterns comprise (i) condition content at any level within the generated rules, (ii) program variable referred in a condition, (iii) program variables used or modified as part of condition's action block of the condition;

mapping one or more parameters associated with the extracted set of rules with pre-stored meta data, wherein the mapping is performed using one or more machine learning techniques;

translating one or more rules from the extracted set of rules into a target defined format, wherein the one or more rules are translated based on the mapping of the one or more parameters with the pre-stored meta data;

deriving, based on historical business meta data, the business process and terms for each variable in the one or more application source codes, wherein the business process and terms is derived using the machine learning techniques, wherein the deriving further comprises:

mapping one or more parameters associated with the one or more rules with the historical business meta data using the machine learning techniques, wherein learning of the machine learning techniques comprises understanding of business meaning for each said variable in the one or more application source codes by processing each variable against the historical business metadata and data acquired from a static code analysis in a form of technical knowledge;

classifying the mapped one or more parameters into one or more categories, wherein the one or more categories includes constants, system variables, flags, log variables, display variables, input variables, and output variables;

auto populating details of the one or more rules of the set of extracted rules to the rule template; and analyzing the translated one or more rules to obtain a validated set of rules.

2. The processor-implemented method of claim 1, further comprising deriving, based on the classification of the mapped one or more parameters, relevant information from the one or more parameters associated with extracted set of rules.

3. The processor-implemented method of claim 2, further comprising:
acquiring data by performing the static code analysis on the received plurality of inputs; and
deriving, based on the acquired data, the relevant information for the one or more parameters.

4. The processor-implemented method of claim 3, wherein the acquired data includes data type and usage of the one or more parameters associated with the one or more rules, type of impact of a rule of the one or more rules in which the one or more parameters are used, and scope of the impact.

5. The processor-implemented method of claim 1, wherein the translation of the one or more rules is preceded by performing at least one of (i) a merging mechanism on the extracted set of rules or (ii) a splitting mechanism on the extracted set of rules.

6. The processor-implemented method of claim 1, classifying, based on a number of conditions in each rule of the extracted set of rules, each rule of the of the extracted set of rules as a simple rule, a medium rule, or a complex rule.

7. A system, comprising:
a memory;
one or more communication interfaces; and
one or more hardware processors coupled to said memory through said one or more communication interfaces, wherein said one or more hardware processors are configured to:

receive, a plurality of inputs from one or more application source code components associated with one or more software applications, wherein the plurality of inputs includes one or more application source codes pertaining to the one or more software applications;

extract, based on a control flow analysis and a data flow analysis, a set of rules embedded in the one or more application source codes of the one or more software applications, wherein
the extraction of the set of rules is preceded by satisfying one or more pre- requisites,
the one or more pre-requisites comprises (a) an availability of business process and terms for the input (b) mapping of the business process and terms with technical meta data of the one or more software applications, and (c) a pre-defined template to capture and deliver the extracted set of rules, and
the mapping of the business process and terms with the technical meta data is performed using machine learning techniques;

determine, using the control flow analysis and the data flow analysis, a control flow and a data flow between one or more programs of the one or more application source codes, wherein the control flow and the data flow are represented as a control flow graph and a data flow graph;

generate, using the control flow analysis and the data flow analysis, a hierarchical call structure of the one or more programs comprised in an application source code of the one or more application source codes, wherein
the hierarchical call structure is generated from parent components or entry point components by including each child program of one or more child programs in the control flow and data flow,
the parent components or the entry components and one or more child programs are associated with the one or more software applications,
components in the hierarchical call structure are grouped and associated with the parent components or the entry point components,
a status of the control flow and the data flow is determined from the generated hierarchical call structure, the status corresponds to:
end of the control flow and the data flow, and
no end of the control flow and the data flow;

identify, based on the generated hierarchical call structure, a plurality of conditional statements of the one or more software applications;

traverse forward through the control flow and the data flow till end of either the control flow or the data flow;

identify, among the group components, one or more conditional statements of the plurality of conditional statements that generate rules, wherein the generated rules are identified by:
generating one or more hierarchical structures of the one or more conditional statements based on the control flow analysis; and performing a data flow based analysis in the one or more hierarchical structures of the one or more conditional statements;

eliminate technical rules of the extracted set of rules, by filtering the generated rules based on pre-defined patterns, wherein the pre-defined patterns comprise (i) condition content at any level within the generated rules, (ii) program variable referred in a condition, (iii) program variables used or modified as part of condition's action block of the condition;

map one or more parameters associated with the extracted set of rules with pre-stored meta data, wherein the mapping is performed using one or more machine learning techniques;

translate, one or more rules from the extracted set of rules into a target defined format, wherein the one or more rules are translated based on the mapping of the one or more parameters with the pre-stored meta data;

derive, based on historical business meta data, the business process and terms for each variable in the one or more application source codes, wherein the business process and terms is derived using the machine learning techniques, wherein the deriving further comprises:

mapping one or more parameters associated with the one or more rules with the historical business meta data using the machine learning techniques, wherein learning of the machine learning techniques comprises understanding of business meaning for each said variable in the one or more application source codes by processing each variable against the historical business metadata and data acquired from a static code analysis in a form of technical knowledge;

classify the mapped one or more parameters into one or more categories, wherein the one or more categories includes constants, system variables, flags, log variables, display variables, input variables, output variables;

auto populate details of the one or more rules of the set of extracted rules to the rule template; and analyze (208) the translated one or more rules to obtain a validated set of rules.

8. The system of claim 7, wherein the one or more hardware processors are further configured to derive, based on the classification of the mapped one or more parameters, relevant information from the one or more parameters associated with extracted set of rules.

9. The system of claim 8, wherein the one or more hardware processors are further configured to:
acquire data by performing the static code analysis on the received plurality of inputs; and
derive, based on the acquired data, the relevant information for the one or more parameters.

10. The system of claim 9, wherein the acquired data includes data type and usage of the one or more parameters associated with the one or more rules, type of impact of a rule of the one or more rules in which the one or more parameters are used, and scope of the impact.

11. The system of claim 7, wherein prior to obtaining the translated set of rules, the one or more hardware processors are further configured to perform at least one of (i) a merging mechanism on the extracted set of rules or (ii) a splitting mechanism on the extracted set of rules.

12. One or more non-transitory machine readable information storage mediums comprising one or more instructions which when executed by one or more hardware processors cause:

receiving, a plurality of inputs from one or more application source code components associated with one or more software applications, wherein the plurality of inputs includes one or more application source codes pertaining to the one or more software applications;

extracting, based on a control flow analysis and a data flow analysis, a set of rules embedded in the one or more application source codes of the one or more software applications, wherein
the extraction of the set of rules is preceded by satisfying one or more pre-requisites,
the one or more pre-requisites comprises (a) an availability of business process and terms for the input (b) mapping of the business process and terms with technical meta data of the one or more software applications, and (c) a pre-defined template to capture and deliver the extracted set of rules, and
the mapping of the business process and terms with the technical meta data is performed using machine learning techniques;

determining, using the control flow analysis and the data flow analysis, a control flow and a data flow between one or more programs of the one or more application source codes, wherein the control flow and the data flow are represented as a control flow graph and a data flow graph;

generating, using, the control flow analysis and the data flow analysis, a hierarchical call structure of the one or more programs comprised in an application source code of the one or more application source codes, wherein
the hierarchical call structure is generated from parent components or entry point components by including each child program of one or more child programs in the control flow and data flow,
the parent components or the entry components and one or more child programs are associated with the one or more software applications,
components in the hierarchical call structure are grouped and associated with the parent components or the entry point components,
a status of the control flow and the data flow is determined from the generated hierarchical call structure, the status corresponds to:
end of the control flow and the data flow, and
no end of the control flow and the data flow;

identifying, based on the generated hierarchical call structure, a plurality of conditional statements of the one or more software applications; traversing forward through the control flow and the data flow till end of either the control flow or the data flow;

identifying, among the group components, one or more conditional statements of the plurality of conditional statements that generate rules, wherein the generated rules are identified
generating one or more hierarchical structures of the one or more conditional statements based on the control flow analysis; and
performing a data flow based analysis in the one or more hierarchical structures of the one or more conditional statements;

eliminating technical rules of the extracted set of rules, by filtering the generated rules based on pre-defined patterns, wherein the pre-defined patterns comprise (i) condition content at any level within the generated rules, (ii) program variable referred in a condition, (iii) program variables used or modified as part of condition's action block of the condition;

mapping one or more parameters associated with the extracted set of rules with pre-stored meta data, wherein the mapping is performed using one or more machine learning techniques;

translating, one or more rules from the extracted set of rules into a target defined format, wherein the one or more rules are translated based on the mapping of the one or more parameters with the pre-stored meta data;

deriving, based on historical business meta data, the business process and terms for each variable in the one or more application source codes, wherein the business process and terms is derived using the machine learning techniques, wherein the deriving further comprises:

mapping one or more parameters associated with the one or more rules with the historical business meta data using the machine learning techniques, wherein learning of the machine learning techniques comprises understanding of business meaning for each said variable in the one or more application source codes by processing each variable against the historical business metadata and data acquired from a static code analysis in a form of technical knowledge;

classifying the mapped one or more parameters into one or more categories, wherein the one or more categories includes constants, system variables, flags, log variables, display variables, input variables, and output variables;

auto populating details of the one or more rules of the set of extracted rules to the rule template; and analyzing the translated one or more rules to obtain a validated set of rules.

13. The one or more non-transitory machine readable information storage mediums of claim 11, wherein the one or more hardware processors further causes deriving relevant information from the one or more parameters associated with extracted set of rules.

14. The one or more non-transitory machine readable information storage mediums of claim 13, wherein the one or more hardware processors further causes acquiring data by performing the static code analysis on the received plurality of inputs; and deriving, based on the acquired data, the relevant information for the one or more parameters.

15. The one or more non-transitory machine readable information storage mediums of claim 14, wherein the acquired includes data type and usage of the one or more parameters associated with the one or more rules, type of impact of a rule of the one or more rules in which the one or more parameters are used, and scope of the impact.

16. The one or more non-transitory machine readable information storage mediums of claim 12, wherein the step of translating is preceded by performing at least one of (i) a merging mechanism on the extracted set of rules or (ii) a splitting mechanism on the extracted set of rules.

* * * * *